C. Linden,

Air Bed,

N⁰ 36,618. Patented Oct. 7, 1862.

Witnesses;
George Rice
Edw. W. Marston

Inventor;
Clarence Linden

UNITED STATES PATENT OFFICE.

CLARENCE LINDEN, OF EDEN TOWNSHIP, LA SALLE COUNTY, ILLINOIS.

IMPROVED ATMOSPHERIC OR AIR BED AND KNAPSACK.

Specification forming part of Letters Patent No. 36,618, dated October 7, 1862.

*To all whom it may concern:*

Be it known that I, CLARENCE LINDEN, of the township of Eden, in the county of La Salle and State of Illinois, have invented a new Improvement of a Combination of an Atmospheric Air-Bed and a Soldier's Knapsack; and I do hereby declare that the following is a full and exact description thereof, reference being had to the accompanying drawings, and to the letters of reference marked thereon.

The nature of my invention consists in combining and uniting an atmospheric air-bed, which may be used as a field or camp bed, with a soldier's knapsack, so that it can be conveniently used either for a bed or for a knapsack.

To enable others skilled in the art to make and use my invention, I will proceed to describe its construction and operation.

I construct my atmospheric air-bed in any of the known forms out of enameled cloth, rubber cloth, leather, or other suitable material cut in one piece of material. I fasten and secure the sides and ends together by means of rubber paste, glue, or other adhesive paste, so as to form an air chamber perfectly tight. I make an opening in one corner of the bed and insert therein a metal air-cock, for the purpose of inflating the chamber or vacuum with atmospheric air, and in order to exclude the air therefrom, as shown at B, Fig. 1, in the accompanying drawings.

Figure 1:
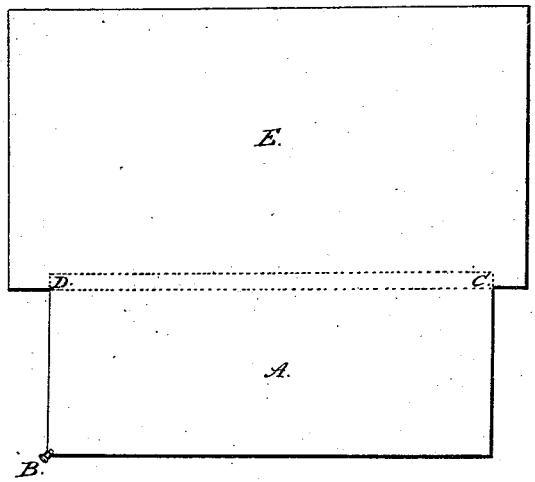
Figure 2:
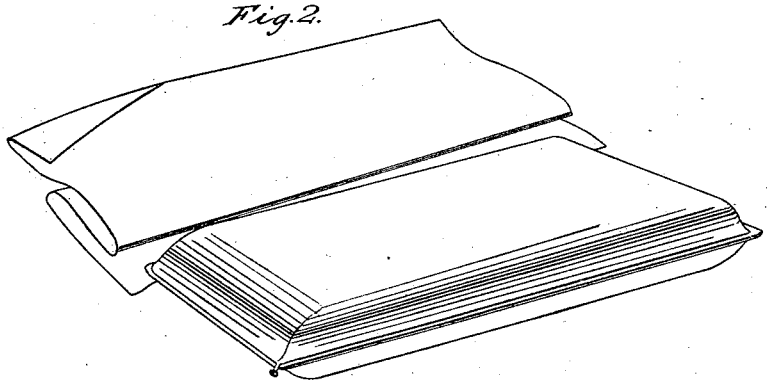
Figure 3:
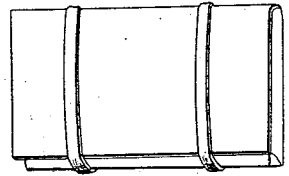

This air-bed A, Fig. 1, I attach by a series of strong stitches on one side to an outside cover, E, made of water-proof enameled cloth, rubber cloth, or leather cut longer and wider than the bed, so that the ends and sides fold over the bed. When the air is excluded from the bed, it can be folded so as to form a pocket, and is converted into a knapsack by being folded four double, as shown in Fig. 3. I attach straps—such as are worn with the common knapsack—to the outside cover, so that it can be borne with ease and convenience.

What I claim as my invention, and desire to secure by Letters Patent as a new and improved article of manufacture, is—

The elastic air-bed constructed so as to be carried and used as a knapsack, when constructed with its parts relatively to each other, all arranged as and for the purpose specified.

CLARENCE LINDEN.

Witnesses:
    GEORGE RICE,
    EDWD. W. MARSTON.